(12) United States Patent
Hamada et al.

(10) Patent No.: US 7,796,503 B2
(45) Date of Patent: Sep. 14, 2010

(54) FAULT TOLERANT NETWORK ROUTING

(75) Inventors: Takeo Hamada, Cupertino, CA (US); Peter J. Czezowski, Santa Clara, CA (US); Ching-Fong Su, Milpitas, CA (US)

(73) Assignee: Fujitsu Limited, Kawasaki (JP)

( * ) Notice: Subject to any disclaimer, the term of this patent is extended or adjusted under 35 U.S.C. 154(b) by 2215 days.

(21) Appl. No.: 10/234,308

(22) Filed: Sep. 3, 2002

(65) Prior Publication Data

US 2004/0042418 A1 Mar. 4, 2004

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .................. 370/225; 370/228; 714/4
(58) Field of Classification Search .............. 370/256, 370/225, 228; 714/4
See application file for complete search history.

(56) References Cited

U.S. PATENT DOCUMENTS

| | | | | |
|---|---|---|---|---|
| 5,706,278 A * | 1/1998 | Robillard et al. | | 370/222 |
| 5,822,299 A | 10/1998 | Goodman | | 370/228 |
| 6,047,331 A * | 4/2000 | Medard et al. | | 709/239 |
| 6,154,463 A | 11/2000 | Aggarwal et al. | | 370/408 |
| 6,400,681 B1 * | 6/2002 | Bertin et al. | | 370/218 |
| 6,480,502 B1 * | 11/2002 | Abadi et al. | | 370/432 |
| 6,744,727 B2 * | 6/2004 | Liu et al. | | 370/228 |
| 6,751,746 B1 * | 6/2004 | Jain et al. | | 714/4 |
| 6,757,242 B1 * | 6/2004 | Wang et al. | | 370/216 |
| 2001/0005358 A1 * | 6/2001 | Shiozawa | | 370/228 |
| 2001/0032271 A1 | 10/2001 | Allen | | 709/239 |
| 2002/0004843 A1 | 1/2002 | Andersson et al. | | 709/238 |
| 2002/0006112 A1 | 1/2002 | Jaber et al. | | 370/238 |
| 2002/0018264 A1 * | 2/2002 | Kodialam et al. | | 359/128 |
| 2002/0075873 A1 * | 6/2002 | Lindhorst-Ko et al. | | 370/394 |
| 2002/0150043 A1 * | 10/2002 | Perlman et al. | | 370/225 |
| 2002/0167898 A1 | 11/2002 | Thang et al. | | 370/216 |
| 2004/0042418 A1 * | 3/2004 | Hamada et al. | | 370/256 |

FOREIGN PATENT DOCUMENTS

| | | |
|---|---|---|
| EP | 1 146 682 A2 | 3/2001 |
| JP | 11-032058 | 2/1999 |
| JP | 2000-022752 | 1/2000 |
| WO | WO 00/74310 A2 | 12/2000 |

(Continued)

OTHER PUBLICATIONS

Vishal Sharma, et al, IETF draft-ietf-mpls-recovery-frmwrk-02.txt, Mar. 2001.*

(Continued)

*Primary Examiner*—Seema S Rao
*Assistant Examiner*—Jianye Wu
(74) *Attorney, Agent, or Firm*—Baker Botts L.L.P.

(57) ABSTRACT

A network provides fault tolerant network routing by identifying root nodes that provide cover against a particular type of fault. Nodes then route copies of packets through these root nodes such that an occurrence of the particular type of fault will not disrupt delivery of the packets.

30 Claims, 4 Drawing Sheets

FOREIGN PATENT DOCUMENTS

| WO | WO 01/86862 A2 | 11/2001 |
|---|---|---|
| WO | WO 01/86864 A2 | 11/2001 |

OTHER PUBLICATIONS

Kodialam, et al., "Restorable Dynamic Quality of Service Routing," *IEEE Communications Magazine*, © IEEE (10 pages), Jun. 2002.

PCT Notification of Transmittal of the International Search Report or the Declaration mailed Jul. 7, 2004, re PCT/CA 03/01301 filed Mar. 9, 2003 (7 pages), Jul. 7, 2004.

Itai, et al., "The Multi-Tree Approach to Reliability in Distributed Networks" (18 pgs.) no date.

Griffin, et al., "A Safe Path Vector Protocol" (10 pgs.) no date.

Hamada, et al., "Policy-Based Management for Enterprise and Carrier IP Networking," *Fujitsu Sci. Tech. J.*, 36, 2, 128-139, Dec. 2000.

Huang, et al., "Extensions to RSVP-TE for MPLS Path Protection" (12 pgs.), Jul. 2001.

Jaeger, et al., "Traffic Restoration in Survivable Wide Area Communication Networks," (34 pgs. plus Appendices A-1 thru A-12, B-1 thru B-21, C-1 thru C-13, D-1 thru D-9, E-1 thru E-19), Department of Informatics, University of Bergen, Jun. 2000.

Ramamurthy, et al., "Survivable WDM Mesh Networks, Part I—Protection," *IEEE*, 1999.

Su, et al., "Protection Path Routing on WDM Networks," (3 pgs.), *OFC*, 2001.

Lumetta, et al., "Towards a Deeper Understanding of Link Restoration Algorithms for Mesh Networks," ECE Department, U. of Illinois and MIT (9 pgs), no date.

Medard, et al., "Capacity-Efficient Restoration for Optical Networks," (pp. 207-209), ECE Department, U. of Illinois (no date).

Medard, et al., "Redundant Trees for Preplanned Recovery in Arbitrary Vertex-Redundant or Edge-Redundant Graphs," pp. 641-652, *IEEE*, 1999.

Medard, et al., "Robuts Routing for Local Area Optical Access Networks," (4 pgs.), MIT Summer Topicals, 2000.

Medard, "Robustness and Recovery in Optical Networks," MIT EECS (22 pgs.) no date.

Murakami, et al., "Comparative Study on Restoration Schemes of Survivable ATM Networks," (8 pgs.), *IEEE Infocom*, 1977.

Natarajan, et al., "Network Resource Information Model Specification, Version 3.0," *TINAC*, (202 pgs.), Dec. 1997.

Wang, et al., "On the Vulnerabilities and Protection of OSPF Routing Protocol," NC State University, (5 pgs.) No date.

Wang, et al., "Using Local Information for WDM Network Protection," MIT (4 pgs.) no date.

Wang, et al., "Fault Recovery Routing in Wide Area Packet Networks," *15th Int. Teletraffic Congress*, (10 pgs.), Jun. 1997.

Yuan, et al., "A Heuristic Routing Algorithm for Shared Protection in Connection-Oriented Network," Fujitsu and U of TX at Dallas, no date (8 pgs.).

Zakrevski, et al., "Fault-Tolerant Message Routing in Computer Networks," Boston Univ., no date (7 pgs.).

Gao, et al., "Inherently Safe Backup Routing with BGP," no date (12 pgs.).

Arijs, et al., "Design of Ring and Mesh Based WDM Transport Networks," *SPIE/Baltzer Science Publishers*, (Cover page plus pp. 25-40), Jul. 2000.

Annexstein, et al., "Independent Spanning Trees with Small Stretch Factors," *DIMACS Technical Report 96-13*, (25 pgs.), Jul. 1996.

Berndt, et al., "TINA: Its Achievements and Its Future Directions," *IEEE Communnications, Surveys & Tutorials*, (20 pgs.), Oct. 2001.

Cheung, "An Intrusion Tolerance Approach for Protecting Network Infrastructures," Graduate Division, U of CA at Davis, (132 pgs.), 1999.

Doverspike, et al., "Fast Restoration in a Mesh Network of Optical Cross-Connects," AT&T Labs (Research), no date (4 pgs.).

Gan, et al., "A Method for MPLS LSP Fast-Reroute Using RSVP Detours," Internet Engineering Task Force, (12 pgs.), Oct. 2001.

Feldmann, et al., "IP Network Configuration for Intradomain Traffic Engineering," AT&T Labs (Research) (27 pgs.) no date.

Translation of an Office Action of Japan Patent Office, Patent Application No. 2004-533109, 3 pages, Mar. 20, 2007.

* cited by examiner

FIG. 2C
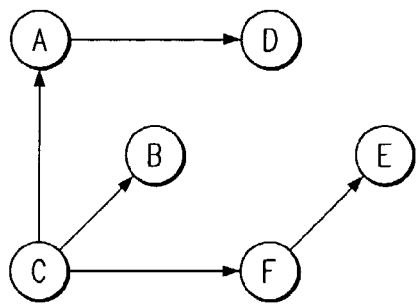
FIG. 2D
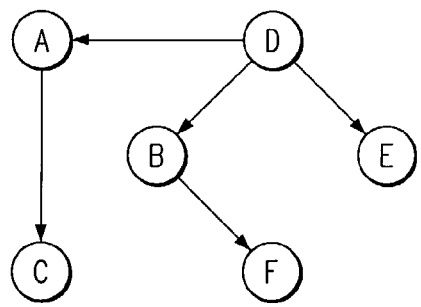
FIG. 2E
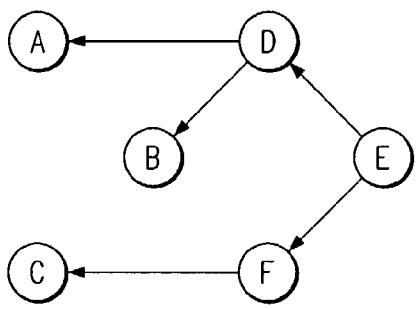
FIG. 2F
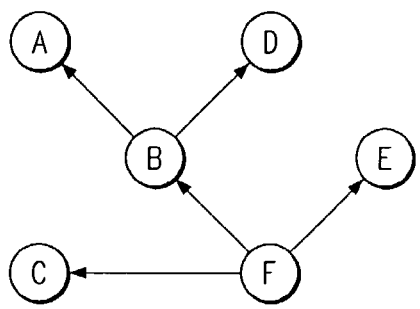
FIG. 3
|        | T(A) | T(B) | T(C) | T(D) | T(E) | T(F) |
|--------|------|------|------|------|------|------|
| (A, B) | 1    | 1    | 0    | 0    | 0    | 1    |
| (A, C) | 1    | 0    | 1    | 1    | 0    | 0    |
| (A, D) | 1    | 0    | 1    | 1    | 1    | 0    |
| (B, C) | 0    | 1    | 1    | 0    | 0    | 0    |
| (B, D) | 0    | 1    | 0    | 1    | 1    | 1    |
| (B, F) | 1    | 1    | 0    | 1    | 0    | 1    |
| (C, F) | 0    | 0    | 1    | 0    | 1    | 1    |
| (D, E) | 1    | 1    | 0    | 1    | 1    | 0    |
| (E, F) | 0    | 0    | 1    | 0    | 1    | 1    |

FIG. 4
| | T(A) | T(B) | T(C) | T(D) | T(E) | T(F) |
|---|---|---|---|---|---|---|
| A | 3 | 1 | 2 | 2 | 1 | 1 |
| B | 2 | 4 | 1 | 2 | 1 | 3 |
| C | 1 | 1 | 3 | 1 | 1 | 1 |
| D | 2 | 2 | 1 | 3 | 3 | 1 |
| E | 1 | 1 | 1 | 1 | 2 | 1 |
| F | 1 | 1 | 2 | 1 | 2 | 3 |
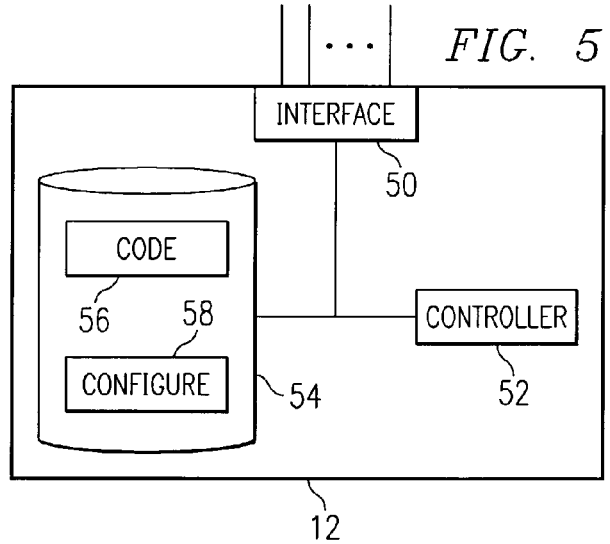
FIG. 5
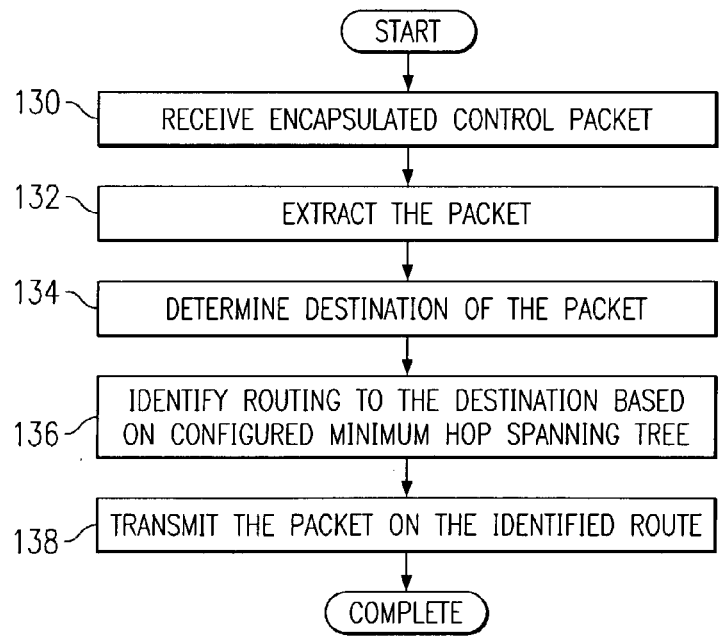
FIG. 8

FAULT TOLERANT NETWORK ROUTING

TECHNICAL FIELD OF THE INVENTION

This invention relates in general to network routing and, more particularly, to fault tolerant network routing.

BACKGROUND OF THE INVENTION

Communication networks, because they operate under real world conditions, often suffer faults that disrupt normal operations. For example, in an optical network, a severed fiber can halt all traffic between nodes. To prevent faults from completely disrupting services, some networks contemplate contingency plans. For example, in an optical ring, a node may detect a fault in one direction and, in response, begin communicating in the opposite direction from the fault.

SUMMARY OF THE INVENTION

In accordance with the present invention, techniques for fault tolerant network routing are provided.

According to a particular embodiment, a method for configuring a network for fault tolerant network routing identifies nodes forming a two connected network, determines routing paths for packets communicated between the nodes, and selects root ones of the nodes that provide cover against a class of faults given packet routing using the routing paths. The method also configures the nodes to duplicate packets to the root nodes.

According to another embodiment, a method for fault tolerant packet routing generates a packet within a network node coupled to a plurality of other network nodes, the packet for delivery to a destination one of the other network nodes. The method identifies a plurality of root ones of the other network nodes, the root nodes providing cover against a class of fault within a network segment formed by the network node and the other network nodes. The method also tunnels a copy of the packet to each of the root nodes.

Embodiments of the invention provide various technical advantages. These techniques enable fault tolerant delivery of packets to their destinations. Depending upon available bandwidth, the techniques may be applied to all packets or to a subset, such as control packets and/or data packets.

According to particular embodiments, the system uses minimum hop spanning trees for routing packets between nodes. Thus these techniques lend themselves for use with many existing networks protocols. For example, some optical networks use optical shortest path first routing. These routing techniques are further applicable to networks using transmission media other than optical.

These techniques further permit varying degrees of fault tolerance. That is, based on information such as network design parameters, the network can provide protection against differing severities of faults, such as link and/or node faults.

Other technical advantages of the present invention will be readily apparent to one skilled in the art in the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which:

FIGS. 2A, 2B, 2C, 2D, 2E, and 2F are diagrams illustrating minimum hop spanning trees for each node of a network segment within the system;

FIG. 3 is a table tracking links forming the routing trees of the nodes within the network segment;

FIG. 4 is a table tracking the degree of node incidence for the routing trees of the network segment;

FIG. 5 is a block diagram illustrating exemplary functional components for a node from the system;

FIG. 8 is a flowchart illustrating a method for a root node to handle encapsulated control packets.

DETAILED DESCRIPTION OF THE DRAWINGS

Figure 1:
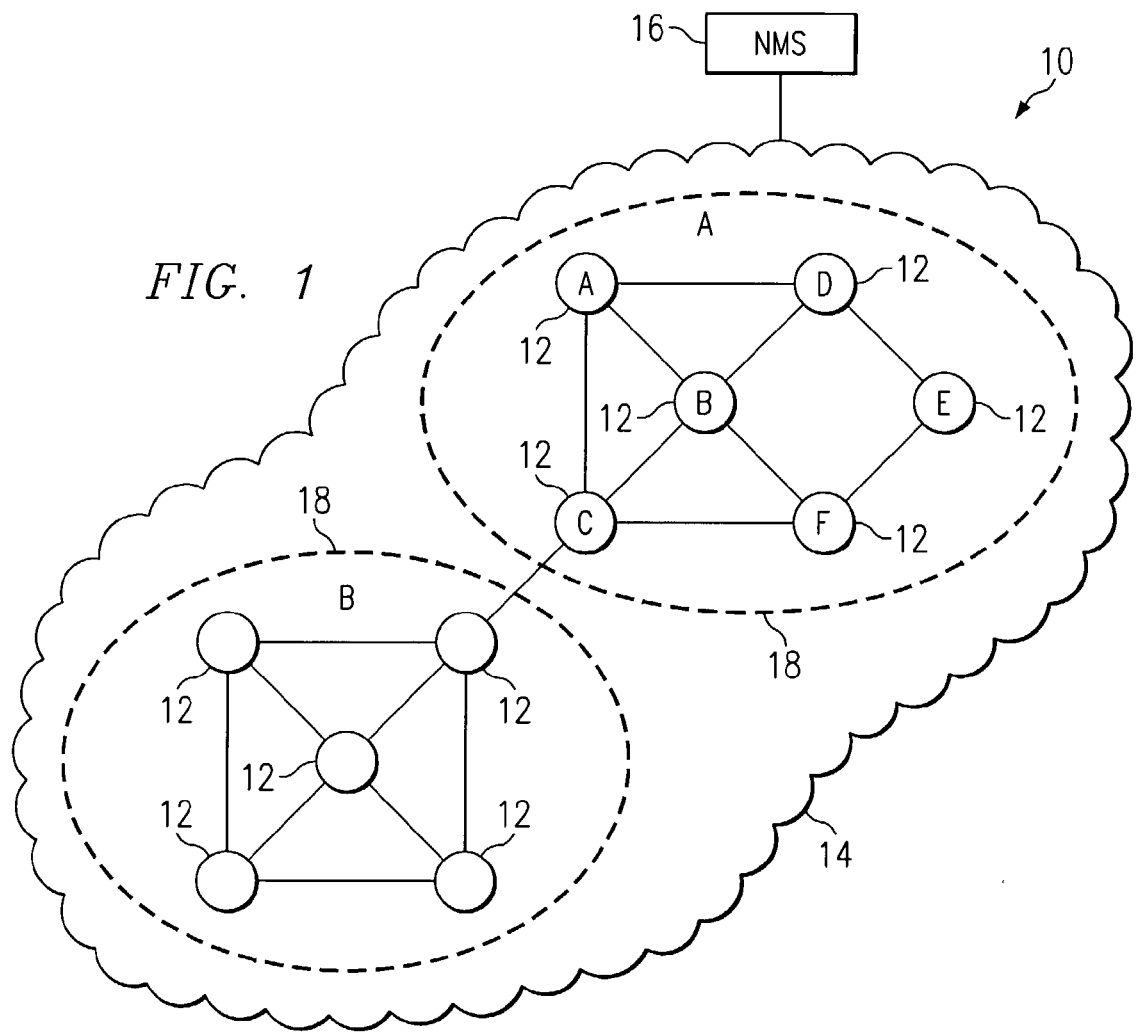
FIG. 1 illustrates a communications system that includes nodes implementing fault tolerant network routing in accordance with particular embodiments of the invention.

FIG. 1 illustrates a communication system, indicated generally at 10, that includes a number of network nodes 12 forming some portion of a network 14. System 10 further includes a network management system (NMS) 16 for management of network 14. In general, nodes 12 operate to provide fault tolerant routing of packets. According to particular embodiments, NMS 16 identifies root nodes 12 that provide cover against certain faults and then configures nodes 12 to use these root nodes 12 to protect against faults. Based on the configurations, nodes 12 tunnel duplicate packets to the roots to ensure packet delivery. Each root node 12 separately attempts to deliver packets to their destinations, ensuring delivery even given certain network faults.

NMS 16 represents any suitable collection and arrangement of components, including controlling logic, for managing elements of network 14. While shown as a separate, single element, system 10 contemplates the features and functionality of NMS 16 being distributed among any number of elements. For example, the features and functionality of NMS 16 may be distributed among one or more nodes 12. During operation, NMS 16 identifies configurations of network 14 to provide fault tolerant network routing and then configures nodes 12 to provide this routing. Specifically, NMS 16 identifies root nodes 12 to provide cover against certain faults. NMS 16 then configures selected nodes 12 to route packets using these root nodes 12.

Nodes 12 represent network elements capable of handling packet based traffic. For example, nodes 12 may include switches, routers, gateways, and other suitable network elements. System 10 contemplates nodes 12 using any suitable transport technologies. Thus, for example, nodes 12 may support optical, electrical, and other suitable communications. During operation, nodes 12 operate to provide fault tolerant routing of packets within selected portions of network 14. Selected nodes 12 act as roots and route copies of packets for other nodes 12 to ensure delivery of these packets to their intended recipients.

In the embodiment illustrated, nodes 12 interconnect to form a network graph. This graph exhibits the property of being one-connected. That is, some nodes 12 rely on a single link to reach other nodes 12. In this example, a single link couples a first segment 18 labeled A (segment A) to a second segment 18 labeled B (segment B). Without additional links, the failure of the link between segment A and segment B will disrupt any communications between the segments.

Segment A and segment B each display the graph property of being two connected. That is, within a segment, each node 12 links to each other node 12 on at least two paths. Thus, for example, given the failure of a single link within segment A, each node 12 will still have an available path to each other node 12. This type of fault is commonly referred to as a single link fault. Other types of faults include node faults, such as the failure of one of nodes 12. The disclosed techniques provide varying degrees of protection to cover against different severities of faults. Typically, a node fault is considered more severe than a link fault.

During operation, NMS 16 configures nodes 12 to provide fault tolerant routing of packets within various portions of network 14. To configure nodes 12 for fault tolerant routing, NMS 16 identifies portions of network 14 that display the graph property of being two connected. For example, NMS 16 may identify segment A. NMS 16 then determines routing information for some or all of nodes 12 within the identified segment. According to particular embodiments, NMS 16 determines minimum hop spanning trees for each node 12 within the segment. Thus, for each node 12 within the segment, NMS 16 determines minimum hop routing paths to every other node 12 within the segment.

In the embodiment illustrated, segment A includes nodes A, B, C, D, E, and F, which are labeled accordingly. As noted, NMS 16 may develop routing information by identifying routing trees for each of these nodes 12. The routing trees reflect the routes traveled by packets passing between nodes 12 and segment A. Particular examples of these routing trees for nodes 12 within segment A are provided in FIGS. 2A-2F.

After determining routing information for some or all nodes 12 within the segment, NMS 16 identifies root nodes 12 that provide cover against particular types of faults. For example, NMS 16 may identify root nodes 12 that provide cover against any single link fault. Cover against any single link fault means that the failure of any one link within the segment will not affect the routing paths from all of root nodes 12. Therefore, even given the failure of a single link, at least one of the root nodes 12 will have an intact routing tree to all other nodes 12 within the segment. However, while NMS 16 identifies cover against a single link fault in this example, system 10 contemplates NMS 16 identifying cover against any suitable combination of link and node faults.

After identifying root nodes 12 to provide cover, NMS 16 configures nodes 12 within the segment to use the root nodes 12 to provide fault tolerant packet routing. Once configured, nodes 12 within the segment begin duplicating packets and tunneling copies of the packets to each root node 12. According to particular embodiments, nodes 12 duplicate only control packets to prevent congestion that may result from duplication of all network traffic. Control packets represent management messages to control operation of elements within network 14. For example, if network 14 is an optical network, nodes 12 may exchange optical supervisory channel (OSC) messages to manage light paths and perform other suitable management and control functions. Based upon available bandwidth, nodes 12 may duplicate control and/or data packets. However, for the remainder of this description, it will be assumed that nodes 12 duplicate only control packets.

As an example, consider NMS 16 selecting nodes C, D, and F to provide cover against any single link fault within segment A. During operation, if node A generates a control packet for communication to node E, node A tunnels copies of this packet to each root node 12 (node C, D, and F). Node A may use any suitable techniques for tunneling these duplicate packets to root nodes 12. For example, node A may encapsulate the duplicate packets as the data portion of packets destined for each root node 12. Similarly, node A may use multi-protocol label switched (MPLS) protocols to tunnel the duplicate packets to each root node 12. In addition to tunneling copies of the packet to root nodes 12, node A may also transmit the packet to node E using a traditional routing path from node A. Thus, for example, the packet may also travel on the minimum hop spanning tree from node A to node E.

Each root node 12, upon receiving a tunneled packet, forwards the packet to the intended destination. Therefore, copies of the packet potentially propagate along a number of different transmission routes to reach the destination. In the given example, node E will receive four copies of the control packet (given no faults within segment A). Based upon a watermark or other suitable information within the packets, node E may discard duplicative packets. For example, using the transmission control protocol/internet protocol (TCP/IP) sequence number, node E can identify and discard duplicative packets. In the event of a fault, node E may not receive all four copies of the control packet from node A. However, given any single link fault, node E will receive at least one copy of the control packet. For example, because root nodes C, D, and F provide cover against any single link fault, the failure of any link within segment A will not disrupt the delivery of control packets from all of the roots.

Figure 2A:
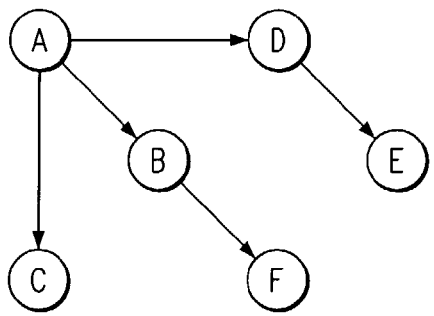
Figure 2B:
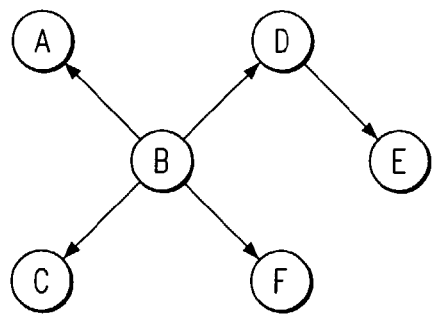

FIGS. 2A, 2B, 2C, 2D, 2E, and 2F are routing diagrams illustrating minimum hop spanning trees for each node 12 within segment A of network 14. These figures illustrate exemplary routing information used by NMS 16 to identify cover against faults. Appropriately, each figure corresponds to the minimum hop spanning tree for the matching lettered node. For example, FIG. 2A corresponds to a minimum hop spanning tree with node A as the root. Thus, each of FIGS. 2A-2F illustrate potential routing of packets from various nodes 12 within segment A. However, while particular minimum hop spanning trees are illustrated in these figures, it should be apparent that they do not represent the only solutions for minimum hop spanning trees. For example, FIG. 2A illustrates only one of two potential minimum hop spanning trees having node A as the route. NMS 16 may use any suitable techniques for identifying particular routing trees for each node 12. Moreover, while these figures illustrate minimum hop spanning trees for routing packets, NMS 16 may generate routing trees using any suitable techniques. Thus, the routing information need not reflect shortest path routing from each node 12. However, the routing information analyzed by NMS 16 should reflect the actual transmission paths to be used for routing packets within the identified segment.

Based upon the determined routing information, NMS 16 identifies root nodes 12 that will provide cover against a particular type of fault. According to particular embodiments, NMS 16 generates a link incidence matrix that indicates the effect of link faults on the minimum hop spanning trees for each node 12. NMS 16 then uses the generated matrix to select nodes 12 to provide cover against a certain class of fault. With the link incident matrix, NMS 16 can identify nodes 12 providing cover against link faults.

According to particular embodiments, NMS 16 also configures routing information into nodes 12. For example, after determining routing trees for node 12, NMS 16 may populate routing tables or other appropriate structures used by nodes 12 to route packets. Alternatively, nodes 12 may exchange messages to determine routing paths and then perform self-configuration. In those circumstances, NMS 16 may query nodes 12 to obtain routing information for the segment.

FIG. 3 illustrates a table, indicated at 30, specifying a link incidence matrix for nodes 12 within segment A. For each node 12, table 30 specifies the links that form the routing tree from that node 12. Thus, the information within table 30 indicates the effect of link faults upon each of the minimum hop spanning trees for nodes A-F within segment A. The first column within table 30 lists the nine links between nodes 12 within segment A. The remaining six columns indicate the effect of link faults upon the minimum hop spanning trees formed from the six nodes within segment A. For example, the second column labeled T(A), specifies the particular links used to form the minimum hop spanning tree from node A. Therefore, this column indicates the effects of link faults upon the minimum hop spanning tree formed with node A as the root. In these six columns, a value of one indicates that a failure of the corresponding link will disrupt the routing tree. A value of zero indicates that a failure of the corresponding link will not disrupt the routing tree. For example, for the routing tree formed from node A, a failure of links AB, AC, AD, BF, or DE will disrupt the routing tree. However, a failure of links BC, BD, CF, or EF will not disrupt the routing tree.

Using this information, NMS 16 can identify nodes 12 that provide cover against link faults. For example, to determine cover against any single link fault, NMS 16 identifies selected routing trees that, when combined, are not all affected by the failure of any single link within segment A. For example, routing trees A, B, C, and F provide cover against any single link fault. Similarly, routing trees C, D, and F also provide cover against any single link fault. This illustrates that a particular segment may have a number of different covers available, and different covers may use different numbers of root nodes. To reduce the duplication of packets within the segment, NMS 16 may select the cover solution that uses the least number of root nodes 12. Thus, for this example, NMS 16 could select nodes C, D, and F as root nodes to provide cover against any single link fault.

FIG. 4 illustrates a table, indicated at 40, that specifies a node incidence degree matrix for nodes 12 within segment A. This matrix identifies the degree of involvement of each node 12 within each routing tree. NMS 16 may use the information within table 40 to identify cover against node faults within segment A. As with table 30, table 40 includes incidence information calculated using the minimum hop spanning trees as illustrated in FIGS. 2A through 2F. The first column within table 40 lists the six nodes 12 within segment A. The remaining columns identify the degree of link incidence for the nodes within each of the six routing trees. The degree of link incidence tracks the number of links into and out of a particular node 12 within a routing tree.

For example, the second column lists the degree of link incidence for each node 12 within the routing tree formed with node A as the root. In this tree, node A links to nodes B, C, and D. Thus the value in the first row for routing tree A is three. In routing tree A, node B links to node A and node F. Thus the value in the second row is two. Node C links only to node A. Thus the value in third row is one. This value of one indicates that the failure of node C will not affect routing of packets to the remaining nodes 12 within the routing tree formed from node A. Similarly, the other leaves of routing tree A (nodes E and F) also have a value of one for their degree of link incidence. Therefore, routing tree A provides cover against the failure of node C, E, or F.

However, it is unlikely that NMS 16 can predict which node 12 within segment A may fail. Thus, NMS 16 may identify a collection of routing trees that provide cover against the failure of any single node 12 within segment A. For example, nodes D, E, and F provide cover against the failure of any single node 12 within segment A. That is, given the failure of a single node 12, the remaining nodes 12 are all reachable using at least one of the routing trees of the selected cover nodes 12. Therefore, NMS 16 may configure nodes 12 within segment A to route copies of packets such that any single node fault will not disrupt communication with remaining nodes 12.

While tables 30 and 40 illustrate particular arrangements of information for identifying cover against particular classes of faults, system 10 contemplates NMS 16 using any appropriate techniques for identifying cover against particular classes of faults. In addition, the graph properties of an identified network segment may drive the type of cover available. For example, given a three connected graph, NMS 16 can identify cover against any double link faults. Therefore, the particular information used by NMS 16 may depend upon the properties of network 14, the selected class of faults for which to provide cover, and other appropriate criteria.

Moreover, NMS 16 may use a combination of techniques to identify cover against more than one class of faults. For example, NMS 16 may identify solutions for cover against single link faults and solutions for cover against single node faults. NMS 16 may then select an intersection of these solutions that will provide cover against any single link or node fault.

FIG. 5 is a block diagram illustrating exemplary functional elements of node 12. In the embodiment illustrated, node 12 includes an interface 50, a controller 52, and a memory 54. Using interface 50, node 12 links with other elements of system 10, such as other nodes 12 and NMS 16. Interface 50 provides one or more ports for coupling to other devices. Thus, using interface 50, node 12 can link to a number of other nodes 12.

Controller 52 controls the operation of node 12. Controller 52 may include any suitable combination of microprocessors, controllers, logic devices, or other suitable controlling elements. For example, controller 52 may include a microprocessor that executes logic routines. During operation, controller 52 may access information maintained within memory 54. In the embodiment illustrated, memory 54 includes code 56 and configuration information 58. Code 56 represents any suitable logic routines for use in controlling the operation of node 12. Configuration information 58 includes settings and other information for controlling the specific operation of node 12. For example, configuration information 58 may specify root nodes 12 and the type of packets for duplication to the root nodes. Configuration information 58 may further include routing tables governing the transmission of packets for delivery to other node 12. For example, configuration information 58 may include routing information that implements a routing tree for node 12.

Node 12 potentially provides a number of different modes of operation. These modes include operation as a source node, destination node, and root node. When operating as a source, node 12 duplicates packets to each root node 12. As previously discussed, node 12 may duplicate all packets that it generates, or may duplicate only some portion, such as control packets. In addition to duplicating packets that it generates, node 12 may also duplicate packets entering into a "covered" segment. For example, if node C receives a control packet from segment B, node C may act as a source node for the packet. This expands the fault tolerance to cover certain packets generated outside of a covered network segment.

To tunnel a packet to a root, node 12 may use a path that reverses the route tree from the root. For example, assume that node A is a root having the routing tree as illustrated in FIG. 2a. To tunnel a packet to node A from node F, the packet travels through node B, which reverses the flow identified for the routing tree from node A. Node F may use this reflective routing to ensure that a link fault that does not affect routing tree A will similarly not affect the tunneling of packets to node A. For example, if the routing tree from node F to node A passes through node C, a failure of link C-F will not disrupt routing tree A but may disrupt transmission from node F to node A. To prevent this scenario, NMS 16 may identify routing trees that use similar paths between source and destination nodes 12. For example, if routing tree A reaches node F through node B, then routing tree F will also reach node A through node D.

When acting as a root, node 12 receives tunneled packets from other nodes 12. Upon receiving a tunneled packet, root node 12 forwards the packet to its intended destination. This path from the root will often travel through different links than the path from the source node and other roots. For example, given the minimum hop spanning trees detailed above, if node C, acting as a root, receives a tunneled packet intended for node E, node C forwards the packet on the route through node F to node E. If the packet originated at node A, then node A may also send a copy of the packet through node D to node E. Thus, while a failure of either link AD or DE will prevent one copy of the packet from reaching node E, the copy from node C may still reach node E.

To forward packets, root node 12 may alter the packets received from source nodes 12. Root node 12 performs alterations and processing of tunneled packets as appropriate given the method used to tunnel packets to the root. For example, if a control packet is tunneled as the data portion of a packet, root node 12 extracts the encapsulated packet and then transmits the extracted packet. Thus, the particular process used by root nodes 12 is driven by the process used to tunnel packets from source nodes 12 to root nodes 12.

As a destination, node 12 may receive multiple copies of packets. Therefore, node 12 typically discards unnecessary copies. To discard duplicative packets, node 12 uses watermarks within received packets. For example, using TCP/IP sequence numbers, node 12 can identify and discard duplicative packets. However, while existing watermarks such as TCP/IP sequence numbers provide an expedient solution, system 10 contemplates nodes 12 using any suitable techniques for tracking and discarding duplicative packets.

The description above provides for three modes of operation for node 12. Depending upon network configurations, each node 12 may act in some or all of these modes at various times as appropriate. Thus, for example, node 12 may at various times act as source, destination and root. However, these operational modes do not set forth all operations performed by nodes 12. Therefore, system 10 contemplates nodes 12 performing other operations as appropriate. For example, as previously discussed, one or more nodes 12 may perform some or all of the operations of NMS 16.

Also, while the embodiment illustrated and the accompanying description detail specific elements and functionalities of node 12, system 10 contemplates nodes 12 having any suitable combination and arrangement of elements providing fault tolerant routing of packets. Thus, the functionalities performed by the particular elements illustrated may be separated or combined as appropriate, and the functionalities of some or all of these elements may be implemented by logic encoded in media.

Figure 6:
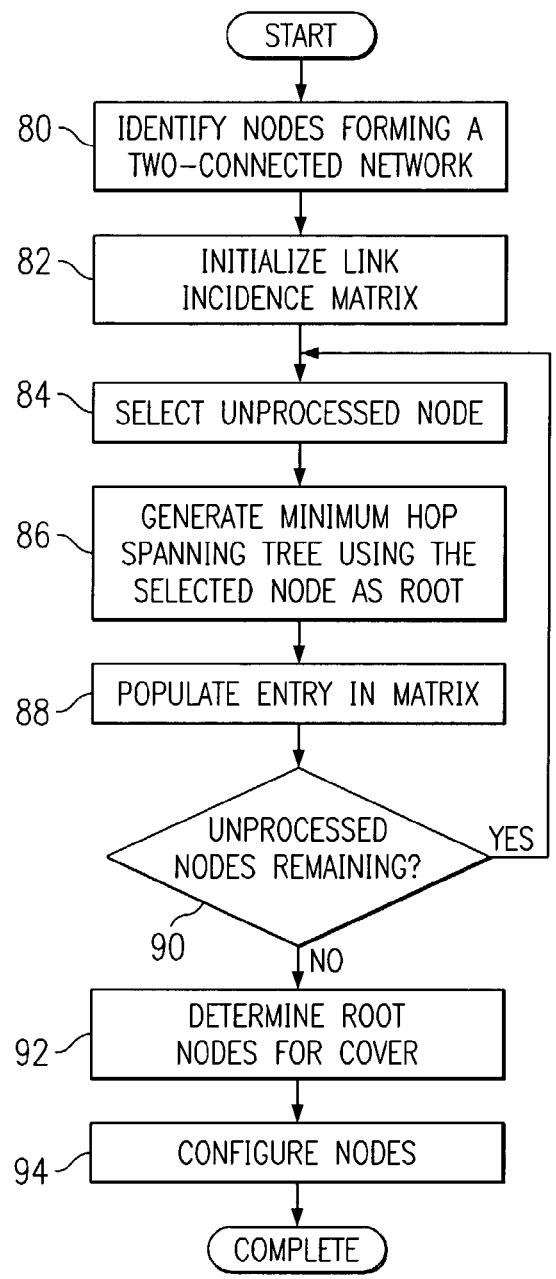
FIG. 6 is a flowchart illustrating a method for determining nodes for covering single link faults within the network portion.

FIG. 6 is a flowchart illustrating a method for NMS 16 to configure nodes 12 to perform fault tolerant routing of packets. Specifically, the flowchart details the operation of NMS 16 in selecting roots providing cover against single link faults. NMS 16 initially identifies nodes 12 forming a two connected network at step 80. For example, within network 14, NMS 16 may identify a two connected portion, such as segment A. NMS 16 initializes a link incidence matrix at step 82. For example, NMS 16 may set up a table, such as table 30, that identifies the links within the identified segment.

NMS 16 selects an unprocessed node 12 at step 84. Initially, this selects any one of nodes 12 within the identified segment. NMS 16 generates a minimum hop spanning tree using the selected node 12 as root at step 86. This generates a routing diagram, such as one of the routing trees illustrated in FIGS. 2A-2F. Using the generated routing information, NMS 16 populates an entry for the selected node 12 in the link incidence matrix at step 88. For example, NMS 16 may populate the column corresponding to the selected node with ones and zeros to indicate link incidence with the routing tree. NMS 16 determines whether other unprocessed nodes 12 are remaining at step 90. If so, NMS 16 repeats steps 84 through 90. Using this process, NMS 16 populates a complete link incidence matrix for nodes 12 within an identified segment.

Using the link incidence matrix, NMS 16 determines root nodes 12 for cover at step 92. As previously discussed, NMS 16 may use any suitable techniques for identifying a group of nodes 12 providing cover against a single link fault. NMS 16 then configures nodes 12 at step 94. For example, NMS 16 may inform all nodes 12 within the identified segment of the selected roots. Nodes 12 within the segment may then begin fault tolerant routing of packets. NMS 16 may repeat the process detailed in this flowchart to identify and configure other segments of network 14 to provide fault tolerant network routing. For example, NMS 16 may perform these steps for segment A, segment B, and other appropriate segments within network 14.

The preceding flowchart and accompanying description illustrate only an exemplary method for NMS 16 to identify cover against single link faults and configure nodes 12. However, system 10 contemplates NMS 16 using any suitable techniques for performing these tasks. Thus, many of the steps in this flowchart may take place simultaneously and/or in different orders than as shown. Moreover, NMS 16 may use methods with additional steps, fewer steps, and/or different steps, so long as the methods remain appropriate. Also, the preceding flowchart illustrates the operation of NMS 16 in providing cover against single link faults. As previously discussed, system 10 contemplates NMS 16 performing similar processes to determine cover against other types of faults.

Figure 7:
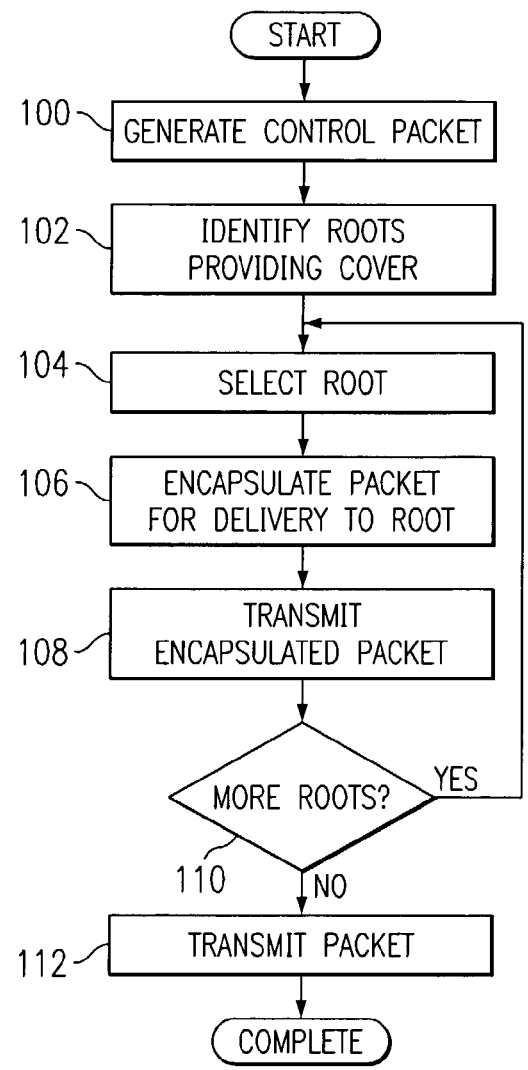
FIG. 7 is a flowchart illustrating a method for routing control packets to provide fault tolerance.

FIG. 7 is a flowchart illustrating a method for node 12, operating as a source, to support fault tolerant routing of packets. Node 12 generates a control packet at step 100. Node 12 identifies roots providing cover at step 102. For example, node 12 may access configuration information 58 to identify root nodes selected by NMS 16. Node 12 selects one of the roots at step 104, encapsulates the control packet for delivery to the selected root at step 106, and transmits the encapsulated packet at step 108. These steps tunnel a copy of the control packet to the selected root. As previously discussed, node 12 uses any suitable techniques to effect this tunneling of packets based upon the configurations and protocols used within network 14. Node 12 determines whether it has tunneled copies to all roots at step 110. If more roots remain, node 12 performs steps 104 through 108 again. With this process, node 12 tunnels copies of the control packet to all identified roots. After tunneling copies of the control packet to the roots, node 12 transmits the packet to the destination at step 112. In this step, node 12 transmits the packet using traditional routing to the destination. However, since the root nodes provide cover, node 12 need not communicate the packet using traditional routing.

Thus, the preceding flowchart and accompany description illustrate a method for node 12 to provide fault tolerant routing of a control packet. However, as with the flowchart illustrated in FIG. 6, system 10 contemplates node 12 using any suitable techniques for operating to provide fault tolerant routing as the source for packets. Thus, many of the steps in this flowchart may take place simultaneously and/or in different orders than as shown. In addition, node 12 may use methods with additional steps, fewer steps, and/or different steps so long as the methods remain appropriate.

FIG. 8 is a flowchart illustrating a method for node 12 to operate as a root. Node 12 receives an encapsulated control packet at step 130. For example, node 12 may receive a packet routed using MPLS protocols or other suitable tunneling techniques. Node 12 extracts the control packet at step 132 and determines the destination of the packet at step 134. This identifies the originally intended destination of the packet. For example, node C may receive a tuneled control packet from node A, with the control packet intended for delivery to node E.

Node 12 identifies routing to the destination based on the configured minimum hop spanning tree at step 136. For example, a routing table within node 12 may indicate an adjacent node 12 based upon the intended destination. For the tunneled packet received at node C from node A, node C identifies the route to node E. Node 12 transmits the control packet on the identified route at step 138. Thus, node C would transmit the packet to node F for delivery to node E.

The preceding flowchart and accompanying description illustrate an exemplary method for node 12 operating as a root. However, as with the other flowcharts, system 10 contemplates node 12 using any suitable techniques for operating as a root. Thus, many of the steps in this flowchart may take place simultaneously and/or in different orders than as shown. Moreover, node 12 may use methods with additional steps, fewer steps, and/or different steps, so long as the methods remain appropriate.

Although the present invention has been described in several embodiments, a myriad of changes and modifications may be suggested to one skilled in the art, and it is intended that the present invention encompass such changes and modifications as fall within the scope of the present appended claims.

What is claimed is:

1. A method for fault tolerant packet routing, the method comprising:
   generating a packet within a network node coupled to a plurality of other network nodes, the packet for delivery to a destination one of the other network nodes;
   identifying a plurality of root ones of the other network nodes, the root nodes providing cover against a class of fault within a network segment formed by the network node and the other network nodes; and
   tunneling a copy of the packet to each of the root nodes.

2. The method of claim 1, further comprising:
   receiving a tunneled packet from one of the other network nodes;
   extracting an encapsulated packet from the tunneled packet;
   selecting a link for transmitting the extracted packet based upon a destination address of the extracted packet; and
   transmitting the extracted packet on the selected link.

3. The method of claim 1, further comprising:
   receiving a plurality of packet copies communicated from the root nodes;
   determining that the packet copies are duplicates of each other; and
   discarding extra ones of the packet copies.

4. The method of claim 3, wherein determining that the packet copies are duplicates comprises comparing TCP/IP sequence numbers of the packet copies.

5. The method of claim 1, wherein the network segment is at least a two connected network, and the copies of the packet are transmitted from the network node on at least two links from the network node.

6. The method of claim 1, further comprising:
   identifying a routing path from the network node to the destination network node; and
   transmitting the packet on the identified routing path.

7. The method of claim 1, wherein each node within the network segment uses a minimum hop routing tree to route packets to each other node within the network segment.

8. The method of claim 7, wherein the routing trees from the root nodes provide cover against any single link fault within the network segment.

9. The method of claim 7, wherein tunneling a copy of the packet to one of the root nodes comprises:
   encapsulating the copy of the packet within a tunneled packet; and
   transmitting the tunneled packet on a path to the root node that reverses the routing tree from the root node to the network node.

10. A network node comprising:
    an interface operable to couple to a plurality of other network nodes forming a network segment, the interface further operable to link directly to at least two of the other network nodes; and
    a processor operable to generate a packet for delivery to a destination one of the other network nodes and to identify a plurality of root ones of the other network nodes, the root nodes providing cover against a class of fault within the network segment, the processor further operable to tunnel a copy of the packet to each of the root nodes using the interface.

11. The network node of claim 10, wherein:
    the interface is further operable to receive a tunneled packet from one of the other network nodes; and
    the processor is further operable to extract an encapsulated packet from the tunneled packet, to select a link from the interface for transmitting the extracted packet based upon a destination address of the extracted packet, and to transmit the extracted packet on the selected link.

12. The network node of claim 10, wherein:
    the interface is further operable to receive a plurality of packet copies communicated from the root nodes; and
    the processor is further operable to determine that the packet copies are duplicates of each other and to discard extra ones of the packet copies.

13. The network node of claim 12, wherein the processor is further operable to determine that the packet copies are duplicates by comparing TCP/IP sequence numbers of the packet copies.

14. The network node of claim 10, wherein the network segment is at least a two connected network, and wherein the processor transmits the copies of the packet on at least two links from the interface.

15. The network node of claim 10, wherein the processor is further operable to identify a routing path to the destination network node and transmit the packet on the identified routing path.

16. The network node of claim 10, wherein each node within the network segment uses a minimum hop routing tree to route packets to each other node within the network segment.

17. The network node of claim 16, wherein the routing trees from the root nodes provide cover against any single link fault within the network segment.

18. The network node of claim 16, wherein the processor is further operable to tunnel a copy of the packet to one of the root nodes by:
 encapsulating the copy of the packet within a tunneled packet; and
 transmitting the tunneled packet on a path to the root node that reverses the routing tree from the root node to the network node.

19. The network node of claim 10, further comprising a memory maintaining a list of the root nodes and a routing table implementing a routing tree from the network node.

20. A non-transitory computer readable medium storing logic for fault tolerant packet routing, the logic operable when executed to perform the steps of:
 generating a packet within a network node coupled to a plurality of other network nodes, the packet for delivery to a destination one of the other network nodes;
 identifying a plurality of root ones of the other network nodes, the root nodes providing cover against a class of fault within a network segment formed by the network node and the other network nodes; and
 tunneling a copy of the packet to each of the root nodes.

21. The non-transitory computer readable medium claim 20, further operable to perform the steps of:
 receiving a tunneled packet from one of the other network nodes;
 extracting an encapsulated packet from the tunneled packet;
 selecting a link for transmitting the extracted packet based upon a destination address of the extracted packet; and
 transmitting the extracted packet on the selected link.

22. The non-transitory computer readable medium of claim 20, further operable to perform the steps of:
 receiving a plurality of packet copies communicated from the root nodes;
 determining that the packet copies are duplicates of each other; and
 discarding extra ones of the packet copies.

23. The non-transitory computer readable medium of claim 22, wherein determining that the packet copies are duplicates comprises comparing TCP/IP sequence numbers of the packet copies.

24. The non-transitory computer readable medium of claim 20, wherein the network segment is at least a two connected network, and the copies of the packet are transmitted from the network node on at least two links from the network node.

25. The non-transitory computer readable medium of claim 20, further operable to perform the steps of:
 identifying a routing path from the network node to the destination network node; and
 transmitting the packet on the identified routing path.

26. The non-transitory computer readable medium of claim 20, wherein each node within the network segment uses a minimum hop routing tree to route packets to each other node within the network segment.

27. The non-transitory computer readable medium of claim 20, wherein the routing trees from the root nodes provide cover against any single link fault within the network segment.

28. The non-transitory computer readable medium of claim 20, wherein tunneling a copy of the packet to one of the root nodes comprises:
 encapsulating the copy of the packet within a tunneled packet; and
 transmitting the tunneled packet on a path to the root node that reverses the routing tree from the root node to the network node.

29. A network node comprising:
 means for generating a packet within a network node coupled to a plurality of other network nodes, the packet for delivery to a destination one of the other network nodes;
 means for identifying a plurality of root ones of the other network nodes, the root nodes providing cover against a class of fault within a network segment formed by the network node and the other network nodes; and
 means for tunneling a copy of the packet to each of the root nodes.

30. A method for fault tolerant packet routing, the method comprising:
 in a first mode of operation,
  generating a packet within a network node coupled to a plurality of other network nodes, the packet for delivery to a destination one of the other network nodes;
  identifying a plurality of root ones of the other network nodes, the root nodes providing cover against a class of fault within a network segment formed by the network node and the other network nodes, wherein each node within the network segment uses a minimum hop routing tree to route packets to each other node within the network segment and the routing trees from the root nodes provide cover against any single link fault within the network segment; and
  tunneling a copy of the packet to each of the root nodes;
 in a second mode of operation,
  receiving a tunneled packet from one of the other network nodes;
  extracting an encapsulated packet from the tunneled packet;
  selecting a link for transmitting the extracted packet based upon a destination address of the extracted packet; and
  transmitting the extracted packet on the selected link; and
 in a third mode of operation,
  receiving a plurality of packet copies communicated from the root nodes;
  determining that the packet copies are duplicates of each other; and
  discarding extra ones of the packet copies.

* * * * *